(12) United States Patent
Jiang et al.

(10) Patent No.: US 12,235,182 B2
(45) Date of Patent: Feb. 25, 2025

(54) END-CONNECTING TYPE HYDRAULIC LOADER

(71) Applicant: NO.703 Research Institute of CSSC, Harbin (CN)

(72) Inventors: Lidong Jiang, Harbin (CN); Shan Chang, Harbin (CN); Yingli Chen, Harbin (CN); Lin Fu, Harbin (CN)

(*) Notice: Subject to any disclaimer, the term of this patent is extended or adjusted under 35 U.S.C. 154(b) by 0 days.

(21) Appl. No.: 18/614,657

(22) Filed: Mar. 23, 2024

(65) Prior Publication Data
US 2024/0319042 A1    Sep. 26, 2024

(30) Foreign Application Priority Data
Mar. 23, 2023    (CN) .......................... 202310295555.2

(51) Int. Cl.
*G01M 13/021* (2019.01)
*G01M 13/026* (2019.01)
*G01M 13/027* (2019.01)

(52) U.S. Cl.
CPC ........ *G01M 13/021* (2013.01); *G01M 13/026* (2013.01); *G01M 13/027* (2013.01)

(58) Field of Classification Search
CPC . G01N 2203/0244; G01N 2291/02827; G01N 27/82; G01N 3/56; G01N 2203/0664; G01N 2291/0258; G01N 29/14; G01N 29/449; G01N 17/00; G01N 2203/0008; G01N 2203/0023; G01N 2203/0062; G01N 2203/0073; G01N 27/60; G01N 27/825; G01N 3/32; G01N 3/38; G01N 3/42; G01N 2021/6497; G01N 21/64; G01N 33/0078; G01M 13/021; G01M 13/02;
(Continued)

(56) References Cited

U.S. PATENT DOCUMENTS 3,680,373 A * 8/1972 Kearfott .............. G01M 13/021
                                                    73/162
6,805,518 B2 * 10/2004 Bruso ....................... B09C 1/08
                                                    405/128.85
(Continued)

FOREIGN PATENT DOCUMENTS

CN       110487539 A       11/2019
CN       210464922 U        5/2020
(Continued)

*Primary Examiner* — Andre J Allen
(74) *Attorney, Agent, or Firm* — Novoclaims Patent Services LLC; Mei Lin Wong

(57) ABSTRACT

An end-connecting type hydraulic loader to solve the difficult loading and assembly on the same side in closed power closed testing in planetary gearbox, includes a transmission shaft (3), an internal output inner gear sleeve (1) on a left end of the transmission shaft (3), a thrust shaft (5) rotatably mounted on the transmission shaft (3) and positioned on a right side of internal output inner gear sleeve (1), an external output inner gear sleeve (2) coaxially installed on the internal output inner gear sleeve (1) and connected to the thrust shaft (5), a spiral floating cylinder (9) on a right end of the thrust shaft (5) and a siding assembly on the transmission shaft (3) meshed with the spiral floating cylinder (9) having a left and right sliding movement along the transmission shaft (3) under a hydraulic oil circuit action of the transmission shaft.

9 Claims, 1 Drawing Sheet

(58) Field of Classification Search
CPC .............. G01M 13/026; G01M 13/025; G01M 13/028; G01M 13/023; G01M 13/04; G01M 13/00; G01M 7/00; G01M 13/022; G01M 13/027; G01M 17/022; G01M 7/045; G01M 7/08; G01M 15/044
USPC .......................................................... 73/162
See application file for complete search history.

(56) References Cited

U.S. PATENT DOCUMENTS

| | | | |
|---|---|---|---|
| 12,104,977 B1 * | 10/2024 | Jiang | ................... G01M 13/021 |
| 12,111,226 B1 * | 10/2024 | Chang | ................ G01M 13/025 |
| 2014/0150589 A1 | 6/2014 | Johannsen et al. | |
| 2019/0203774 A1 * | 7/2019 | Bager | .................... F16D 1/096 |

FOREIGN PATENT DOCUMENTS

| | | | | | |
|---|---|---|---|---|---|
| CN | 111288139 | A | * | 6/2020 | |
| CN | 114354423 | A | | 4/2022 | |
| CN | 115126833 | A | * | 9/2022 | |
| CN | 116292813 | A | * | 6/2023 | |
| DE | 10348757 | A1 | * | 5/2005 | .............. F16H 3/54 |
| JP | H07-260628 | A | | 10/1995 | |
| JP | P2003-49930 | A | | 2/2003 | |

* cited by examiner

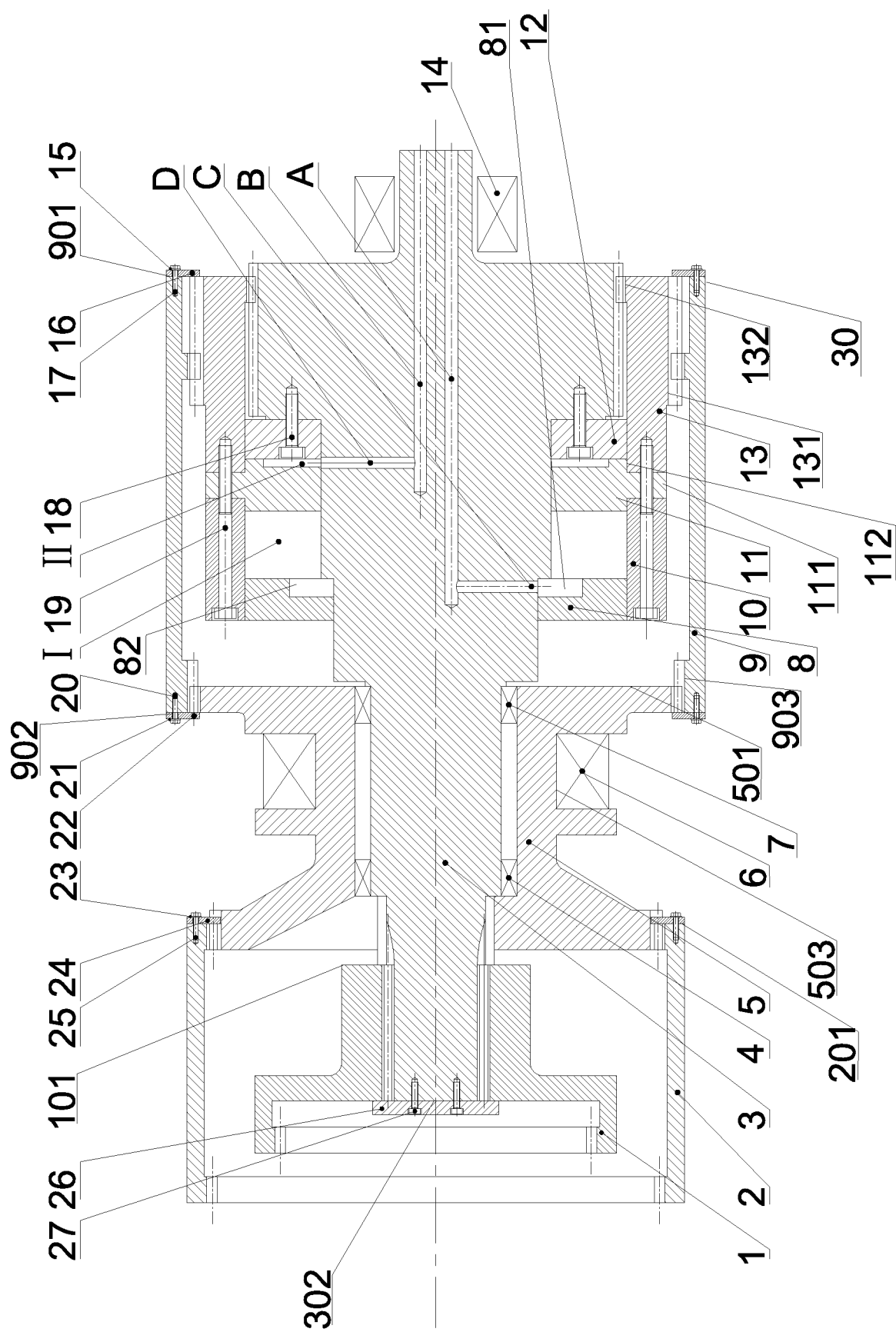

END-CONNECTING TYPE HYDRAULIC LOADER

CROSS REFERENCE OF RELATED APPLICATION

This is a non-provisional application which claimed priority of Chinese application number 2023102955552, filing date Mar. 23, 2023. The contents of these specifications, including any intervening amendments thereto, are incorporated herein by reference.

BACKGROUND OF THE PRESENT INVENTION

Field of Invention

The present invention relates to a hydraulic loader, and more particularly to an end-connecting type hydraulic loader which is suitable for internal closed power closed testing for planetary gearboxes, and is a core equipment for testing planetary gearboxes, especially high-power planetary gearboxes.

Description of Related Arts

Testing is usually required to truly evaluate the service lifespan and performance of planetary gearboxes and their components, and testing are generally divided into open test and closed test.

The open test bench is generally composed of a power machine, a test planetary reducer, and an energy consumer. The power machine outputs power to the test planetary reducer, the output power is consumed by the energy consumer, and the test planetary reducer is in a testing state. The advantage is that the test bench is simple in structure, but the disadvantage is that the output energy is wasted and cannot be recovered.

The mechanical closed test bench is the most common test bench in closed test. For planetary reducers, generally, the output ends and input ends of the test planetary gearbox and the accompanying test planetary gearbox are connected correspondingly to form a closed state. The advantage of this closed test is that the power flow circulates in a closed system composed of the test planetary gearbox and the accompanying test planetary gearbox. Because there is power loss in a closed system, this power loss is generally only equivalent to a few percent of the total power of the test planetary gearbox, which is provided by the power machine.

According to the loading principle and loading position, mechanical closed test benches are divided into external closed test benches and internal closed test benches. The internal closed test bench is mainly composed of a power machine, a test planetary gearbox, a test planetary gearbox, a loader, etc. The principle is that the output ends of the test planetary gearbox and the accompanying test gearbox are directly connected, and the input ends of the test planetary gearbox and the accompanying test gearbox are connected through the long shaft and loader that pass through the interior of the two gearboxes, forming an internal power closed system, and the loader applies and circulates torque to the power closed system. At this time, the loader is connected in series in a closed system. The input and output ends of the loader are on the same side of the loader, and same-side loading requires that the input end and output end of the loader be structurally designed to be on the same side of the loader. At this point, the input end and the output end are coaxially connected, thus making it even more difficult to assemble the input end and the output end with the transmission shaft of the external device.

SUMMARY OF THE PRESENT INVENTION

An object of the present invention is to solve the existing problems of difficult same-side loading and assembly during an internal closed test of a planetary transmission device, and to provide an end-connecting type hydraulic loader.

According to the technical solution of the present invention, an end-connecting type hydraulic loader, comprises a transmission shaft, an internal output inner gear sleeve installed on a left end of the transmission shaft, a thrust shaft rotatably mounted on the transmission shaft and positioned on a right side of internal output inner gear sleeve, an external output inner gear sleeve coaxially installed on the internal output inner gear sleeve and connected to the thrust shaft, a spiral floating cylinder installed on a right end of the thrust shaft and a siding assembly installed on the transmission shaft and meshed with the spiral floating cylinder having a sliding movement to move left and right along the transmission shaft under an action of a hydraulic oil circuit in the transmission shaft.

Furthermore, the end-connecting type hydraulic loader further comprises an internal output baffle installed on a left end surface of the transmission shaft and an internal output connecting bolt connecting the internal output baffle to a left end of the transmission shaft to limit axial movement of the internal output inner gear sleeve to the right side.

Furthermore, the end-connecting type hydraulic loader further comprises an external output baffle and an external output connecting bolt wherein the external output baffle is installed on one end surface of the external output inner gear sleeve through the external output connecting bolts to limit axial movement of the external output inner gear sleeve.

Furthermore, the end-connecting type hydraulic loader further comprises a first bearing, a second bearing and a third bearing, wherein the first bearing and the third bearing are sleeved on the transmission shaft, the first bearing and the second bearing are positioned between the thrust shaft and the transmission shaft and the second bearing is sleeved on an outer wall of the thrust shaft.

Furthermore, the sliding assembly comprises a sliding ring, a sealing ring, a piston ring, a pressure ring and double-layer spiral teeth, wherein the sliding ring, the piston ring and the pressure ring are sliding onto the transmission shaft from left to right to secure into position, the sealing ring is installed between the sliding ring and the piston ring. A sealing oil chamber I is provided for forward loading by a first enclosed area formed by the transmission shaft, the sealing ring, the sliding ring and the piston ring; and a sealing oil chamber II is provided for reverse loading by a second enclosed area formed by the transmission shaft, the piston ring and the pressure ring.

Preferably, the sliding ring has an annular groove on a right side of the sliding ring.

Furthermore, a boss is processed on an outer circumferential side wall of the piston ring, and the sealing ring and the double-layer spiral teeth are installed on the boss of the piston ring through a third bolt.

Furthermore, the spiral floating cylinder has a length of internal teeth smaller than a length of the external teeth of the double-layer spiral teeth.

Furthermore, the transmission shaft is processed with a first horizontal oil passage, a second horizontal oil passage, a first vertical oil passage and a second vertical oil passage.

The first horizontal oil passage and the second horizontal oil passage are provided along the axial direction of the transmission shaft. The first vertical oil passage is provided along the radial direction, having one end connected to the first horizontal oil passage and another end connected to the sealing oil chamber I. The second vertical oil passage is provided along the radial direction, having one end connected to the second horizontal oil passage and another end connected to the sealing oil chamber II.

Furthermore, the end-connecting type hydraulic loader further comprises a left baffle, a left washer, a left bolt, a right washer, a right baffle and a right bolt, the left baffle is installed on a left end of the spiral floating cylinder through the left washer and the left bolt; and the right baffle is installed on a right end of the spiral floating cylinder through the right washer and the right bolt.

Compared to the conventional technologies, the present invention has the following advantages:

(1) Clear hydraulic loading principle and simple operation.
(2) Compact structure and small size.
(3) Smooth loading without impact and real-time stepless loading by adopting hydraulic drive mode.
(4) Suitable for closed full-load testing of planetary gear transmission devices, especially suitable for long-term operation testing.

By analyzing the structural characteristics and test methods of the planetary transmission device, the present invention designs an end-connecting type hydraulic loader, which is used for full-load operation test of the planetary transmission device, and is especially suitable for long-term full-load operation tests. The loader adopts a hydraulic drive method, which can achieve real-time loading with any torque at any time as well as smooth loading without impact. The principle is clear, and the operation is simple.

BRIEF DESCRIPTION OF THE DRAWINGS

FIG. 1 a schematic diagram of an overall structure of the end-connected hydraulic loader according to a preferred embodiment of the present invention.

DETAILED DESCRIPTION OF THE PREFERRED EMBODIMENT

The present invention is further described in details below with the accompanying drawings and specific embodiments, but shall not be interpreted as limiting.

Preferred Embodiment 1

This embodiment is described with reference to FIG. 1 of the drawings. According to this embodiment of the present invention, an end-connected hydraulic loader comprises a transmission shaft 3. In addition, the end-connected hydraulic loader also comprises an internal output inner gear sleeve 1, an external output inner gear sleeve 2, a thrust shaft 5, a spiral floating cylinder 9 and a sliding assembly 30. The internal output inner gear sleeve 1 is installed on a left end surface of the transmission shaft 3, the thrust shaft 5 is rotatably mounted on the transmission shaft 3 and the thrust shaft 5 is positioned on a right side of the internal output inner gear sleeve 1, the external output inner gear sleeve 2 is coaxially installed on the internal output inner gear sleeve 1 and connected to the thrust shaft 5, the spiral floating cylinder 9 is installed on a right end of the thrust shaft 5, and the siding assembly 30 is installed on the transmission shaft 3 and the spiral floating cylinder 9 is meshed with the sliding assembly 30 so that the sliding assembly 30 slides left and right along the transmission shaft 3 under the action of a hydraulic oil circuit in the transmission shaft 3.

According to this embodiment, the end-connected hydraulic loader can be used to load the planetary gearbox test, solving the problem of coaxial side loading in the closed test of the planetary gearbox, reducing the footprint of the test bench, and saving energy and costs.

Preferred Embodiment 2

This embodiment is described with reference to FIG. 1 of the drawings. According to this embodiment of the present invention, the end-connected hydraulic loader further comprises an internal output baffle 26 and an internal output connecting bolt 27. The internal output baffle 26 is installed on a left end surface of the transmission shaft 3 through the internal output connecting bolt 27 to prevent the internal output inner gear sleeve 1 from moving to the right along the axis. This arrangement facilitates the axial positioning of the internal output inner gear sleeve 1 and ensures smooth loading of the transmission shaft 3 and the internal output inner gear sleeve 1. Other components and connection relationships are the same as those in the Preferred Embodiment 1.

Preferred Embodiment 3

This embodiment is described with reference to FIG. 1 of the drawings. According to this embodiment of the present invention, the end-connected hydraulic loader further comprises an external output gasket 23, an external output baffle 24 and an external output connecting bolt 25. The external output baffle 24 is installed on the end surface of the external output inner gear sleeve 2 through the external output connecting bolts 25 and the external output gasket 23. This arrangement is used to limit the axial movement of the external output inner gear sleeve 2. Other components and connection relationships are the same as those in the Preferred Embodiment 1 or 2.

Preferred Embodiment 4

This embodiment is described with reference to FIG. 1 of the drawings. According to this embodiment of the present invention, the end-connected hydraulic loader further comprises a first bearing 4, a second bearing 6 and a third bearing 7. The first bearing 4 and the third bearing 7 are sleeved on the transmission shaft 3. The first bearing 4 and the second bearing 6 are positioned between the thrust shaft 5 and the transmission shaft 3. The second bearing 6 is sleeved on an outer wall of the thrust shaft 5. With this arrangement, when the three bearings are in actual use, the first bearing 4 and the third bearing 7 only bear radial loads, and the second bearing 6 bears both axial and radial loads. Other components and connection relationships are the same as those in the Preferred Embodiment 1, 2 or 3.

The end-connected hydraulic loader further comprises a fourth bearing 14. The fourth bearing 14 is sleeved on the transmission shaft 3 and only bears radial load.

Preferred Embodiment 5

This embodiment is described with reference to FIG. 1 of the drawings. According to this embodiment of the present invention, the sliding assembly 30 comprises a sliding ring 8, a sealing ring 10, a piston ring 11, a pressure ring 12 and double-layer spiral teeth 13. The sliding ring 8, the piston ring 11 and the pressure ring 12 are sliding onto the transmission shaft 3 from left to right to secure into position. The sealing ring 10 is installed between the sliding ring 8 and the piston ring 11. Accordingly, a sealing oil chamber I is provided for forward loading by a first enclosed area formed by the transmission shaft 3, the sealing ring 10, the sliding ring 8 and the piston ring 11; and a sealing oil chamber II is provided for reverse loading by a second enclosed area formed by the transmission shaft 3, the piston ring 11 and the pressure ring 12. The double-layer spiral teeth 13 comprises internal teeth 131 meshed with the transmission shaft 3 and external teeth 132 meshed with the internal teeth of the double-layer spiral teeth 13. With this arrangement, the sliding assembly 30 can enter different sealing oil chambers (I or II) through different oil channels under the action of high-pressure oil to achieve forward loading and reverse loading. The structure is simple and the loading is reliable. Other components and connection relationships are the same as those in the Preferred Embodiment 1, 2, 3 or 4.

Preferred Embodiment 6

This embodiment is described with reference to FIG. 1 of the drawings. According to this embodiment of the present invention, the sliding ring 8 has an annular groove 81 on a right side of the sliding ring 8. This arrangement facilitates the connection between the high-pressure oil and the sealing oil chamber II, thereby the high-pressure oil directly enters the sealing oil chamber II and expands a chamber capacity of the sealing oil chamber II, making it more suitable for high-power use environments. Other components and connection relationships are the same as those in the Preferred Embodiment 1, 2, 3, 4 or 5.

Preferred Embodiment 7

This embodiment is described with reference to FIG. 1 of the drawings. According to this embodiment of the present invention, the end-connected hydraulic loader further comprises a third bolt 19 and the piston ring 11 is processed with a boss 111 on an outer circumferential side wall 112 of the piston ring 11. The sealing ring 10 and the double-layer spiral teeth 13 are installed on the boss 111 of the piston ring 11 through the third bolt 19. This arrangement facilitates the simultaneous connection of the sealing ring 10 and the double-layer spiral teeth 13 through an annular boss 111 under the bolt action. The structure is simple and the connection method is reliable. Other components and connection relationships are the same as those in the Preferred Embodiment 1, 2, 3, 4, 5 or 6.

Preferred Embodiment 8

This embodiment is described with reference to FIG. 1 of the drawings. According to this embodiment of the present invention, the spiral floating cylinder 9 has a length of internal teeth smaller than a length of the external teeth 132 of the double-layer spiral teeth 13. This arrangement facilitates sufficient sliding space. Other components and connection relationships are the same as one of those in the Preferred Embodiment 1-7.

Preferred Embodiment 9

This embodiment is described with reference to FIG. 1 of the drawings. According to this embodiment of the present invention, the transmission shaft 3 is processed with a first horizontal oil passage A, a second horizontal oil passage B, a first vertical oil passage C and a second vertical oil passage D. The first horizontal oil passage A and the second horizontal oil passage B are both opened along the axial direction of the transmission shaft 3. The first vertical oil passage C is opened along the radial direction, having one end connected to the first horizontal oil passage A and another end connected to the sealing oil chamber I. The second vertical oil passage D is opened along the radial direction, having one end connected to the second horizontal oil passage B and another end connected to the sealing oil chamber II.

This arrangement facilitates forward loading through the first horizontal oil passage A and the first vertical oil passage C, and reverse loading through the second horizontal oil passage B and the second vertical oil passage D. Other components and connection relationships are the same as one of those in the Preferred Embodiment 1-8.

Preferred Embodiment 10

This embodiment is described with reference to FIG. 1 of the drawings. According to this embodiment of the present invention, the end-connected hydraulic loader further comprises a left baffle 22, a left washer 21, a left bolt 20, a right washer 15, a right baffle 16 and a right bolt 17. The left baffle 22 is installed on a left end 902 of the spiral floating cylinder 9 through the left washer 21 and the left bolt 20. The right baffle 16 is installed on a right end 901 of the spiral floating cylinder 9 through the right washer 15 and the right bolt 17.

This arrangement utilizes the right washer 15 and the right bolt 17 to affix the right baffle 16 to the right end 901 of the spiral floating cylinder 9 to prevent the spiral floating cylinder 9 from moving axially to the left; and utilizes the left bolt 20 and the left washer 21 to affix the left baffle 22 on the left end 902 of the spiral floating cylinder 9 to prevent the spiral floating cylinder 9 from moving axially to the right. Other components and connection relationships are the same as one of those in the Preferred Embodiment 1-9.

The principle of the present invention is further explained with reference to FIG. 1 as follows:

The principle for forward loading of the end-connected hydraulic loader: The end-connected hydraulic loader adopts hydraulic drive mode. The high-pressure hydraulic oil enters the sealing oil chamber I formed by the transmission shaft 3, the sliding ring 8, the sealing ring 10, and the piston ring 11 through the first horizontal oil passage A and the first vertical oil passage C. The piston ring 11 is hydraulically driven to make a linear motion in the axial direction to the right. The sliding assembly changes the linear motion into a circular motion through a spiral transmission, and a corresponding torsion angle is generated between the transmission shaft 3 and the spiral floating cylinder 9 to form the torque required, and finally the forward loading is complete.

The principle for reverse loading of the end-connected hydraulic loader: The end-connected hydraulic loader adopts hydraulic drive mode. The high-pressure hydraulic oil enters the sealing oil chamber II formed by the transmission shaft 3, the piston ring 11, and the pressure ring 12 through the second horizontal oil passage B and the second vertical oil passage D. The piston ring 11 is hydraulically driven to make a linear motion in the axial direction to the left. The sliding assembly changes the linear motion into a circular motion through a spiral transmission, and a corresponding torsion angle is generated between the transmission shaft 3 and the spiral floating cylinder 9 to form the torque required, and finally the reverse loading is complete.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An end-connecting type hydraulic loader, comprising a transmission shaft (3), an internal output inner gear sleeve (1) installed on a left end of the transmission shaft (3), a thrust shaft (5) rotatably mounted on the transmission shaft (3) and positioned on a right side of internal output inner gear sleeve (1), an external output inner gear sleeve (2) coaxially installed on the internal output inner gear sleeve (1) and connected to the thrust shaft (5), a spiral floating cylinder (9) installed on a right end of the thrust shaft (5) and a siding assembly installed on the transmission shaft (3) and meshed with the spiral floating cylinder (9) having a sliding movement to move left and right along the transmission shaft (3) under an action of a hydraulic oil circuit in the transmission shaft (3), wherein the sliding assembly (30) comprises a sliding ring (8), a sealing ring (10), a piston ring (11), a pressure ring (12) and double-layer spiral teeth (13), wherein the sliding ring (8), the piston ring (11) and the pressure ring (12) are sliding onto the transmission shaft (3) from left to right to secure into position, the sealing ring (10) is installed between the sliding ring (8) and the piston ring (11), thereby a sealing oil chamber I is provided for forward loading by a first enclosed area formed by the transmission shaft (3), the sealing ring (10), the sliding ring (8) and the piston ring (11); and a sealing oil chamber II is provided for reverse loading by a second enclosed area formed by the transmission shaft (3), the piston ring (11) and the pressure ring (12); the double-layer spiral teeth (13) comprises internal teeth (131) meshed with the transmission shaft (3) and external teeth (132) meshed with internal teeth of the spiral floating cylinder (9).

2. The end-connecting type hydraulic loader according to claim 1, further comprising an internal output baffle (26) installed on a left end surface of the transmission shaft (3) and an internal output connecting bolt (27) connecting the internal output baffle (26) to the a left end surface of the transmission shaft (3) to prevent the internal output inner gear sleeve (1) from moving axially to the right side.

3. The end-connecting type hydraulic loader according to claim 2, further comprising an external output baffle (24) and an external output connecting bolt (25) wherein the external output baffle (24) is installed on one end surface of the external output inner gear sleeve (2) through the external output connecting bolts (25).

4. The end-connecting type hydraulic loader according to claim 3, further comprising a first bearing (4), a second bearing (6) and a third bearing (7), wherein the first bearing (4) and the third bearing (7) are sleeved on the transmission shaft (3), the first bearing (4) and the second bearing (6) are positioned between the thrust shaft (5) and the transmission shaft (3) and the second bearing (6) is sleeved on an outer wall of the thrust shaft (5).

5. The end-connecting type hydraulic loader according to claim 4, wherein the sliding ring (8) has an annular groove (81) on a right side of the sliding ring (8).

6. The end-connecting type hydraulic loader according to claim 5, further comprising a third bolt (19); and a boss (111) on an outer circumferential side wall (112) of the piston ring (11), wherein the sealing ring (10) and the double-layer spiral teeth (13) are installed on the boss (111) of the piston ring (11) through the third bolt (19).

7. The end-connecting type hydraulic loader according to claim 6, wherein the spiral floating cylinder (9) has a length of internal teeth smaller than a length of the external teeth (132) of the double-layer spiral teeth (13).

8. The end-connecting type hydraulic loader according to claim 7, wherein the transmission shaft (3) is processed with a first horizontal oil passage (A) and a second horizontal oil passage (B) along the axial direction of the transmission shaft 3, a first vertical oil passage (C) and a second vertical oil passage (D) along the radial direction of the transmission shaft (3), wherein the first vertical oil passage (C) has one end connected to the first horizontal oil passage (A) and another end connected to the sealing oil chamber I; and the second vertical oil passage (D) has one end connected to the second horizontal oil passage (B) and another end connected to the sealing oil chamber II.

9. The end-connecting type hydraulic loader according to claim 8, further comprising a left baffle (22), a left washer (21), a left bolt (20), a right washer (15), a right baffle (16) and a right bolt (12), wherein the left baffle (22) is installed on a left end (902) of the spiral floating cylinder (9) through the left washer (21) and the left bolt (20); and the right baffle (16) is installed on a right end (901) of the spiral floating cylinder (9) through the right washer (15) and the right bolt (17).

* * * * *